United States Patent [19]

Tomimasu et al.

[11] 4,147,934
[45] Apr. 3, 1979

[54] DEVICE FOR MEASURING HIGH-LEVEL IONIZING RADIATION DOSE

[75] Inventors: Takio Tomimasu; Mitukuni Chiwaki, both of Tokyo, Japan

[73] Assignee: Agency of Industrial Science & Technology, Tokyo, Japan

[21] Appl. No.: 869,275

[22] Filed: Jan. 13, 1978

Related U.S. Application Data

[63] Continuation-in-part of Ser. No. 750,372, Dec. 14, 1976, abandoned.

[30] Foreign Application Priority Data

Dec. 16, 1975 [JP] Japan .................................. 51-149072

[51] Int. Cl.² ............................................... G01T 1/22
[52] U.S. Cl. ..................................... 250/370; 307/308; 328/144
[58] Field of Search ........................ 250/370; 307/388; 328/144

[56] References Cited

U.S. PATENT DOCUMENTS

| | | | |
|---|---|---|---|
| 2,985,805 | 5/1961 | Nelson et al. | 307/308 |
| 3,110,806 | 11/1963 | Denney et al. | 307/308 |
| 3,433,954 | 3/1969 | Bowman et al. | 250/370 |

OTHER PUBLICATIONS

"Direct Measurement of Transistor Noise Voltage ...", by Itoh & Knudsen, pp. 2-7 Hewlett-Packard Journal, Oct. 1969.
"Sources of Noise in Transistors", by Niladri Mantena, pp. 8-11, Hewlett-Packard Journal, Oct. 1969.

Primary Examiner—Harold A. Dixon
Attorney, Agent, or Firm—Oblon, Fisher, Spivak, McClelland & Maier

[57] ABSTRACT

When the junction field effect transistor is irradiated by ionizing radiations from a radioactive material or a particle accelerator, defect centers are generated in the depletion layer near the channel layer. The defect centers introduce additional electron states in the forbidden gap of the semiconductor and these additional states cause a great increase of the noise voltage in the junction field effect transistor. The amount of ionizing radiations irradiated to the transistor is directly in proportion to the change of the square of the noise voltage caused by the defect centers. On the basis of this relationship, the dose of the irradiated ionizing radiation can be measured by finding the amount of this change in the square of noise voltage before and after irradiation of the ionizing radiation to the transistor.

3 Claims, 4 Drawing Figures

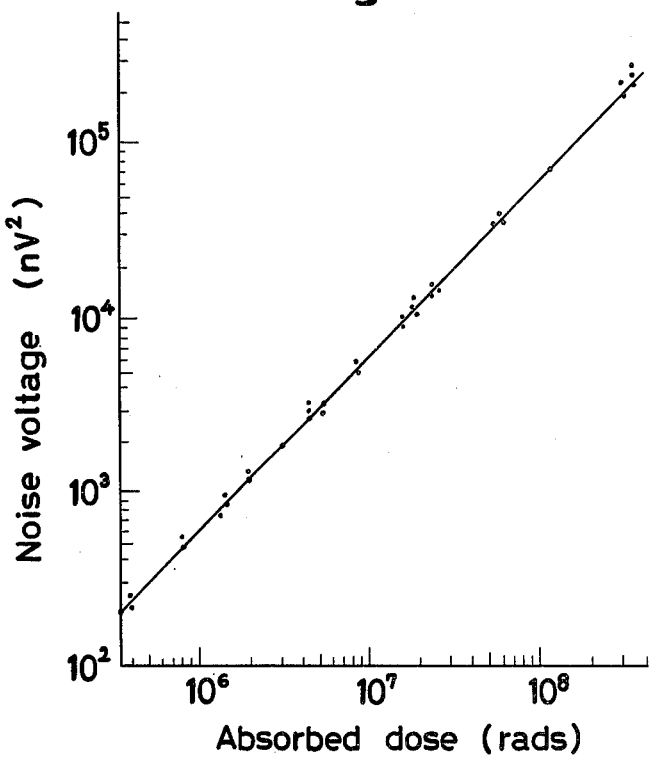
Fig_3
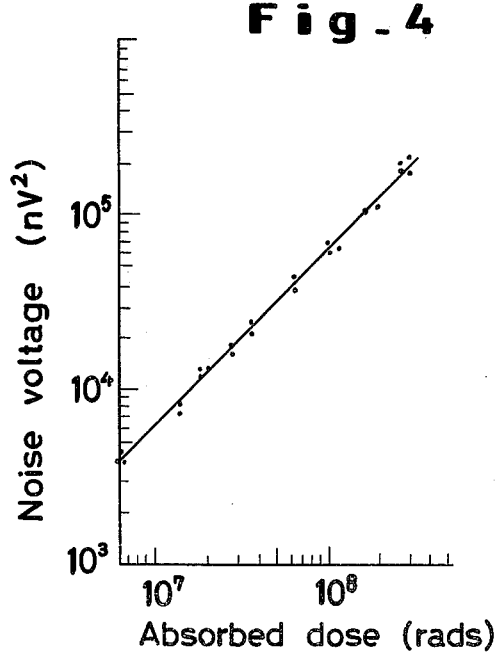
Fig_4

DEVICE FOR MEASURING HIGH-LEVEL IONIZING RADIATION DOSE

REFERENCE TO COPENDING APPLICATION

This is a continuation-in-part application of our copending application U.S. Ser. No. 750,372 filed Dec. 14, 1976, now abandoned.

BACKGROUND OF THE INVENTION

This invention relates to a device for the measurement of ionizing radiation dose. More particularly, the present invention relates to a device for measuring high-level ionizing radiation dose, in which the junction field effect transistor is adopted as a dose detector to effect the measurement of the absorbed radiation dose particularly in the high-level range of from $10^6$ to $10^9$ rads by utilizing the radiation effect on the junction field effect transistor (hereinafter referred to briefly as J-FET).

The devices which have heretofore been developed for the measurement of high-level ionizing radiation dose include a chemical dosimeter which makes use of the chemical change caused in a sample in the form of a solution by the ionizing radiation, a thermal fluorescent dosimeter which utilizes the phenomenon that the energy entrapped by radiation within the measuring element is emitted as fluorescent light upon a thermal treatment, a plastic film dosimeter which utilizes the discoloration of plastics, such as polymethyl methacrylate and blue cellophane, caused by the ionizing radiation, glass dosimeter which utilizes the formation of color centers in glass, a solar battery dosimeter which utilizes the change in resistance of a solar battery and a hydrocarbon dosimeter which utilizes the chemical change in hydrocarbon. For the purpose of measurement of high-level ionizing radiation dose, all these conventional devices combine merits and demerits.

To be specific, most chemical dosimeters are capable of measuring radiation dose to the level of about $10^7$ rads at most and some of the hydrocarbon dosimeters permit dose measurement up to $10^9$ rads. With these dosimeters, the test specimens cannot be reused, the treatments involved consume much time and the specimens required in the detection units cannot easily be reduced in size. With thermal fluorescent dosimeters, measurement of radiation dose beyond the level of $10^6$ rads is not possible. With plastic dosimeters and glass dosimeters, the proportional relationship between the dose of radiation and the response is lost beyond the level of $10^7$ rads. These dosimeters cannot be used for the measurement of dose higher than $10^8$ rads and do not permit re-use of test specimens. With dosimeters utilizing solar batteries, although the proportional relationship between the ionizing radiation dose and the response is obtained over a wide range of from $10^4$ rads to $10^8$ rads, the dosimeters themselves have a disadvantage of being usable only within narrow temperature and humidity ranges and do not permit easy dimensional reduction.

The J-FET is extensively used as the principal element in low-noise low-frequency amplifiers. It has been ascertained in the art that the noise of the J-FET is closely related to the defect centers causable such as by inclusion of impurity in semiconductor. The inventors have made a discovery that the defect center generated in the depletion layer near the channel layer in consequence of the irradiation of the ionizing radiation to J-FET functions to enhance the noise in the same way as the defect center of the type causable such as by inclusion of impurity and that the change in the square of the noise voltage is directly in proportion to the amount of the irradiated radiation dose or to the irradiated radiation fluence. This discovery has led to the present invention.

An object of the present invention, therefore, is to provide a device which permits easy measurement of high-level ionizing radiation dose of the order of from $10^6$ to $10^9$ rads.

Another object of this invention is to provide a device which uses a highly compact measuring unit and yet permits easy measurement of high-level ionizing radiation dose.

A further object of this invention is to provide a device for the measurement of high-level radiation dose which permits ready regeneration of the measuring unit.

SUMMARY OF THE INVENTION

To attain the objects described above according to this invention, there is provided a device for the measurement of ionizing radiation dose, comprising in combination a J-FET adapted to be irradiated by the ionizing radiation to be measured, means for detecting the noise voltage generated in said J-FET, means for computing the square of the noise voltage detected by said means for the detection of noise voltage before and after irradiation of the ionizing radiation under measurement to said J-FET, and means for determining the dose of the ionizing radiation under measurement on the basis of the values of the squares of said two noise voltages.

Since the J-FET is adopted as the measuring element, the device of this invention provides easy measurement of high-level radiation dose on the order of $10^6$ to $10^9$ rads and the measuring element used in this device enjoys a notably long service life. If the measuring element is exposed to a dose of greater than $10^9$ rads, it can be regenerated by being heated at 200° C. and put to use again. Another advantage brought about by the use of J-FET is the ample reduction obtainable in the size of the device.

The other objects and advantages of the present invention will become apparent from the description to be given in further detail hereinbelow with reference to the accompanying drawings.

BRIEF DESCRIPTION OF THE DRAWINGS

FIGS. 3 and 4 are graphs each showing the relation between the absorbed dose and noise voltage obtained by the use of the device of this invention for the measurement of ionizing radiation dose.

DESCRIPTION OF THE PREFERRED EMBODIMENTS

J-FET's are extensively used as principal elements in low-noise, low-frequency amplifiers. It has been ascertained that the J-FET noise is closely related with defect centers such as originate in the presence of impurities included therein. When the J-FET is irradiated with ionizing radiation the defect centers in the depletion layer near the channel layer increase in volume density and, similarly to defect centers such as are caused by impurities, function to increase the noise. It has been confirmed that particularly in the case of a J-FET which generates a noise voltage of the order of several nV, the squared increment of noise voltage ($e^2_{nD}-e^2_{nO}$) is in direct proportion to the amount of radiation dose "D" of ionizing radiation, as represented by the following formula:

$$D = k \cdot (e^2_{nD} - e^2_{nO})$$

wherein "$e_{nO}$" stands for the noise voltage before the irradiation of the ionizing radiation, "$e_{nD}$" for the noise voltage after the irradiation of the ionizing radiation and "k" for the value which is constant for the kind of J-FET 1 in use and is empirically determined.

By using a J-FET as a dose detection element, measuring the noise voltage of the J-FET before and after the irradiation thereof with the ionizing radiation and calculating the increment based on the two values thus measured, the dose of the radiation can easily be determined.

Figure 1:
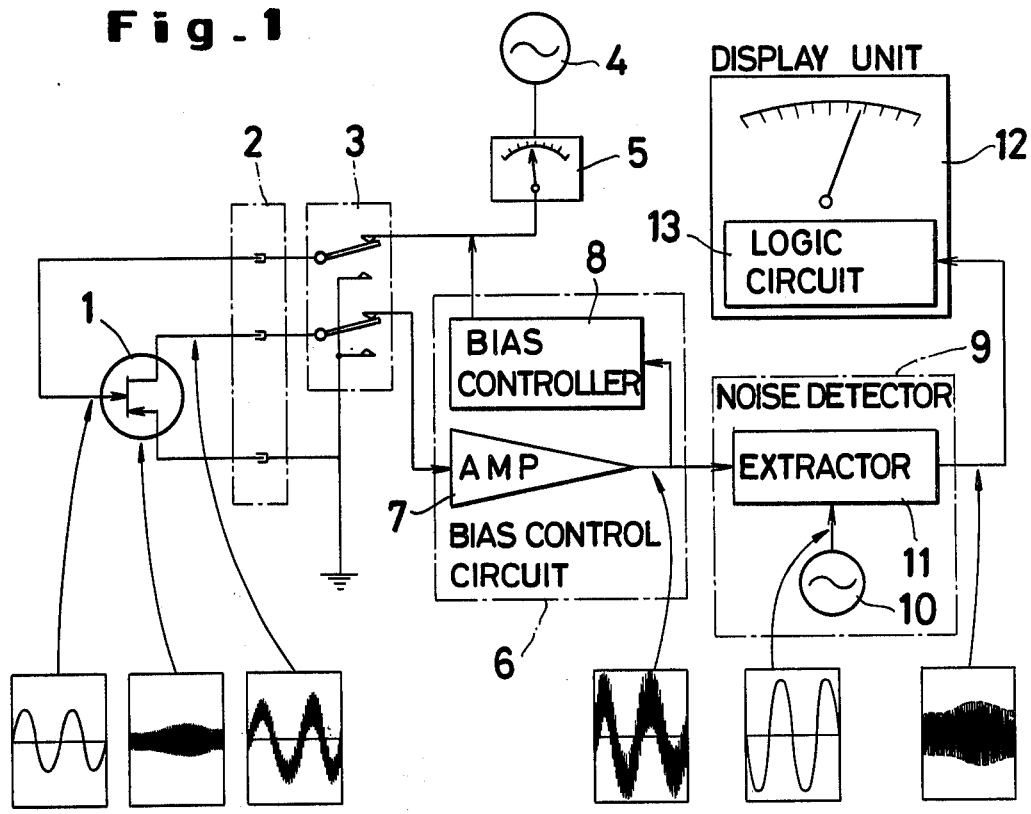
FIG. 1 is a block diagram of the device of this invention for the measurement of high-level ionizing radiation dose.

FIG. 1 is a block diagram representing one embodiment of the device of this invention for measuring high-level ionizing radiation dose. With reference to FIG. 1, the device for measuring the noise voltage of J-FET is roughly divided into four units. Specifically, the device comprises a signal oscillator 4 serving to bias the signal voltage to the gate of J-FET 1, bias control means 6 adapted to amplify the signal including the noise component of the J-FET and feeding back the amplified output to the gate of the J-FET for thereby stabilizing the J-FET operation, a noise detector 9 serving to extract only the noise component from the amplified signal issuing from the bias control means, and a display unit 12 serving to display the extracted noise component.

From the frequency signal generated by the oscillator 4, the selector 5 singles out the prescribed spot frequency. The frequency signal thus selected is applied as the carrier-wave signal to the gate of the J-FET 1 via the relay 3 and the connector 2.

By biasing the gate of the J-FET 1 as described above, the electric current flowing between the source and the drain of the J-FET is controlled and the electric current flowing from the drain and containing the noise component due to the defect center of the J-FET is forwarded through the connector 2 and the relay 3 to the low-noise amplifier 7 of the bias control means 6, with the result that the low-frequency component is amplified. The output of this amplifier 7 is fed back to the gate of the J-FET via the bias control circuit 8 for the purpose of stabilizing the operation of the J-FET and, at the same time, forwarded to the carrier wave extractor 11 of the noise detector 9.

From the output signal which has been generated by the amplifier 7 and forwarded to the carrier wave extractor 11, only the noise component is separated by application of an output signal of the reverse-phase frequency signal from the oscillator 10. The noise-component signal from the extractor 11 is subjected to the squaring operation in the logic circuit 13, with the results of the operation indicated in the display 12.

Figure 2:
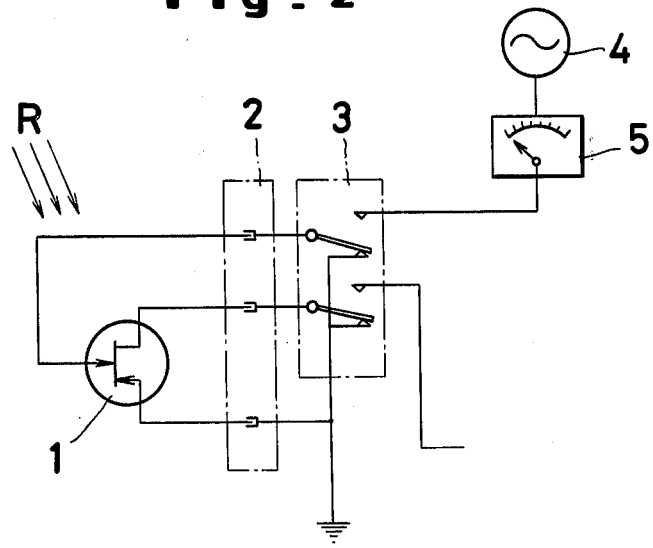
FIG. 2 is an explanatory view showing the state wherein the J-FET in the device of FIG. 1 is irradiated by ionizing radiation.

For the determination of the dose of radiation by use of the apparatus described above, the noise voltage of the J-FET 1 prior to irradiation of the ionizing radiation is measured by the method described above. Then, the J-FET 1 is irradiated by the ionizing radiation "R". During the irradiation of the radiation, the J-FET remains in an electroconductive state. For the protection of the various elements, therefore, the relay 3 is switched to its grounding position and the base and drain of the J-FET are grounded (FIG. 2). When the irradiation of ionizing radiation is completed, the relay 3 is reset and the J-FET is connected to the related elements. Then, the noise voltage of the J-FET is measured again. Because of the radiant energy absorbed, the J-FET has had new defect centers formed therein in addition to the formerly existing defect centers. Consequently, the display indicates a numerical value which corresponds to the square of the total of noise voltages generated by all the defect centers present in the J-FET. By subtracting from the value in the display the square of the noise voltage of the J-FET measured prior to the said irradiation of ionizing radiation, the dose of the radiation in the irradiation just completed can be determined. All the logical operations involved herein can easily be carried out by using known arithmetic circuit.

For effective use in this determination, the J-FET is desired to be of a type which generates a noise voltage of the order of several nV or less when a frequency signal of 1 KHz is applied thereto. The noise voltage measuring circuit in the J-FET which has been described with reference to FIG. 1 is merely one example. Any of the known noise voltage measuring circuits for use in transistors can be used in its place.

If the accumulated dose of radiation absorbed by the J-FET has exceeded $10^9$ rads and, consequently the performance of the J-FET has been intolerably degraded, the J-FET can easily be restored to its initial condition for reuse by removing it from the connector 2 and then giving it a heat treatment at temperatures in the neighborhood of 200° C. for two hours.

The graph of FIG. 3 shows the relation between the dose of the ionizing radiation absorbed (horizontal axis) and the magnitude of the increment of the square ($e^2_n$) of noise voltage consequently observed (vertical axis) as determined by using a device of the construction described above. By the irradiation of a 24.8 MeV electron beam and the J-FET is found to give a noise voltage of about 34.64 nV in the frequency zone of 1 KHz for a dose of about $2 \times 10^6$ rads of ionizing radiation. For an increased dose of about $2 \times 10^7$ rads of ionizing radiation, it is found to give a noise voltage of about 110 nV. The two noise voltages, when raised to the second power, give the values of 1200 $(nV)^2$ and about 12000 $(nV)^2$ respectively. From the results, it is readily seen that the ionizing radiation dose is directly in proportion to the square of the noise voltage.

FIG. 4 is a graph showing the relation between the dose of ionizing radiation and the noise voltage generated consequently as determined by irradiation of the ionizing radiation to a J-FET which, because of an excess increase in dose beyond the level of $10^9$ rads, had its performance degraded and which, therefore, had been regenerated by a heat treatment at about 200° C. for two minutes. By use of the same electron beam as before, the J-FET gives a noise voltage of about 63.2 nV for a dose of about $6 \times 10^6$ rads and a noise voltage of about 257 nV for a dose of about $10^8$ rads, indicating that the regenerated J-FET gives higher levels of noise voltage than the J-FET in its unregenerated state. The two noise voltages, when raised to their second power, give the values of about 4000 and about 66000 respectively. The results clearly indicate that the aforementioned proportional relationship similarly holds good even in this case.

Thus for the same dose of ionizing radiation, the regenerated J-FET generates a higher noise voltage than the J-FET in its unregenerated state. However, since the noise voltage inherent to this particular J-FET is found by finding the noise voltage prior to the irradiation to the ionizing radiation, no incovenience is experienced in putting the regenerated J-FET to re-use.

As described above, this invention uses the J-FET as the element for detecting the high-level dose of the ionizing radiation impinging thereon and effects the desired measurement of the dose of said ionizing radiation on the basis of the change in the square of noise voltage generated by said J-FET before and after the irradiation of said ionizing radiation to this J-FET. In this measurement, substantially no fading is observed. Moreover, the J-FET is such that it can be readily regenerated for reuse by a heat treatment at about 200° C. Since the positional resolving power in the detection of ionizing radiation is of the order of 0.5 mm, the device of this invention is suitable for determining the high-level dose distribution in a given substance being irradiated with ionizing radiations. Because of the adoption of this J-FET, the device enjoys many other advantages such as, for example, high stability of performance with respect to humidity, temperature, impact etc.

What is claimed is:

1. A device for the measurement of ionizing radiation dose, which comprises, in combination, a junction field effect transistor to be irradiated by ionizing radiation under test, means for applying an input signal to said junction field effect transistor, means for detecting the noise voltage generated consequently by said junction field effect transistor, and means for squaring the number of the noise voltage thus detected.

2. The device according to claim 1, wherein said junction field effect transistor generates a noise voltage of several nV or less in the frequency zone of 1 KHz.

3. The device according to claim 1, wherein the terminals of the junction field effect transistor are in a grounded state while the junction field effect transistor is irradiated by the ionizing radiation.

* * * * *

UNITED STATES PATENT AND TRADEMARK OFFICE
CERTIFICATE OF CORRECTION

PATENT NO. : 4,147,934
DATED : April 3, 1979
INVENTOR(S) : TAKIO TOMIMASU ET AL

It is certified that error appears in the above-identified patent and that said Letters Patent are hereby corrected as shown below:

Please correct the Priority data to read as follows:

[30] --Dec. 16, 1975 [JP] Japan ... 50-149072-- rather than

[30] "Dec. 16, 1975 [JP] Japan ... 51-149072" as it now appears.

Signed and Sealed this

Twenty-third Day of October 1979

[SEAL]

Attest:

RUTH C. MASON
Attesting Officer

LUTRELLE F. PARKER
Acting Commissioner of Patents and Trademarks